US012755024B2

(12) United States Patent
Beard et al.

(10) Patent No.: US 12,755,024 B2
(45) Date of Patent: Oct. 6, 2026

(54) DETERMINING A REPRODUCTION NUMBER FOR A MALWARE

(71) Applicant: BRITISH TELECOMMUNICATIONS PUBLIC LIMITED COMPANY, London (GB)

(72) Inventors: Alfie Beard, London (GB); Tom Bowman, London (GB)

(73) Assignee: BRITISH TELECOMMUNICATIONS PUBLIC LIMITED COMPANY, London (GB)

( * ) Notice: Subject to any disclaimer, the term of this patent is extended or adjusted under 35 U.S.C. 154(b) by 0 days.

(21) Appl. No.: 18/844,731

(22) PCT Filed: Feb. 13, 2023

(86) PCT No.: PCT/EP2023/053494
§ 371 (c)(1),
(2) Date: Sep. 6, 2024

(87) PCT Pub. No.: WO2023/169775
PCT Pub. Date: Sep. 14, 2023

(65) Prior Publication Data

US 2025/0209181 A1 Jun. 26, 2025

(30) Foreign Application Priority Data

Mar. 10, 2022 (GB) ..................................... 2203371

(51) Int. Cl.
*G06F 15/16* (2006.01)
*G06F 9/54* (2006.01)
(Continued)

(52) U.S. Cl.
CPC ...... *G06F 21/577* (2013.01); *G06F 2221/034* (2013.01)

(58) Field of Classification Search
CPC .. G06F 2221/034; G06F 30/20; G06F 21/566; H04L 63/145
(Continued)

(56) References Cited

U.S. PATENT DOCUMENTS 7,739,740 B1 6/2010 Nachenberg
8,065,731 B1 11/2011 Nucci
(Continued)

FOREIGN PATENT DOCUMENTS

CN 109190375 1/2019
EP 1990973 11/2008
(Continued)

OTHER PUBLICATIONS

Wanping Liu, Shouming Zhong, "Web malware spread modelling and optimal control strategies", published on Feb. 10, 2017 (19 pages).
(Continued)

*Primary Examiner* — Hamza N Algibhah
(74) *Attorney, Agent, or Firm* — Nixon & Vanderhye P.C.

(57) ABSTRACT

A computer-implemented method of simulating a propagation of a malware through a set of computer systems, the method comprising: identifying a plurality of first simulated computer systems infected with a simulated malware; for each of the first simulated computer systems, infecting a number of neighbouring second simulated computer systems, the number being zero or an integer; and determining a value of a reproduction number, $R_0$, based on the total number of second simulated computer systems and the number of first simulated computer systems.

20 Claims, 6 Drawing Sheets

(51) Int. Cl.
*G06F 21/57* (2013.01)
*H04L 29/06* (2006.01)

(58) Field of Classification Search
USPC ........................................................ 726/23
See application file for complete search history.

(56) References Cited

U.S. PATENT DOCUMENTS

| | | | | |
|---|---|---|---|---|
| 8,683,585 | B1 | 3/2014 | Chen | |
| 8,978,141 | B2 | 3/2015 | Eliseev | |
| 9,060,018 | B1 | 6/2015 | Yu et al. | |
| 9,332,029 | B1 | 5/2016 | Tikhonov | |
| 9,473,520 | B2 * | 10/2016 | Dixon | H04L 63/1416 |
| 9,607,148 | B1 * | 3/2017 | Magar | H04L 63/145 |
| 11,546,767 | B1 | 1/2023 | Shaw | |
| 12,273,376 | B2 * | 4/2025 | Wang | H04L 63/1416 |
| 2007/0150957 | A1 | 6/2007 | Hartrell | |
| 2008/0201129 | A1 * | 8/2008 | Natvig | G06F 21/566 703/22 |
| 2009/0320133 | A1 | 12/2009 | Viljoen | |
| 2011/0041179 | A1 | 2/2011 | Staahlberg | |
| 2011/0078177 | A1 | 3/2011 | Fakeih | |
| 2012/0151588 | A1 | 6/2012 | Wang | |
| 2013/0007883 | A1 * | 1/2013 | Zaitsev | G06F 21/561 726/24 |
| 2013/0340080 | A1 | 12/2013 | Gostev et al. | |
| 2018/0288087 | A1 * | 10/2018 | Hittel | H04L 63/145 |
| 2019/0052659 | A1 | 2/2019 | Weingarten et al. | |
| 2021/0014240 | A1 | 1/2021 | Wang | |
| 2022/0038467 | A1 | 2/2022 | Kimura | |
| 2023/0123046 | A1 * | 4/2023 | Wang | G06F 21/566 726/23 |

FOREIGN PATENT DOCUMENTS

| | | | | |
|---|---|---|---|---|
| EP | 4222923 B1 * | 6/2024 | G06F 21/552 |
| GB | 2574093 | 11/2019 | |
| WO | 2006132987 | 12/2006 | |
| WO | 2019185404 | 10/2019 | |
| WO | 2019185405 | 10/2019 | |
| WO | 2021001237 | 1/2021 | |
| WO | WO-2021001235 A1 * | 1/2021 | H04L 63/145 |
| WO | WO-2021001237 A1 * | 1/2021 | H04L 63/145 |
| WO | 2021165256 | 8/2021 | |
| WO | 2021165257 | 8/2021 | |
| WO | WO-2021165256 A1 * | 8/2021 | H04L 63/1425 |
| WO | 2021198295 | 10/2021 | |
| WO | WO-2021198295 A1 * | 10/2021 | G06F 21/552 |

OTHER PUBLICATIONS

Wright Rob, "What is polymorphic virus?—Definition from WhatIs. com", 2021, pp. 1-5 URL: https:/Iweb.archive.org/ webI20211127061825/https:/ Iwww.techtarget.co (5 pages).
Jia Zhi-Juan et al, 2017 29th Chinese Control and Decision Conference (CCDC), 2017, "Research on computer virus source modeling with immune characteristics", pp. 4616-4619 p. 1, line 10, p. 2, col. 2, lines 16-17, p. 3, col. 2, lines 23-33, p. 4, col. 1, lines 6-10; figure 3; table 1, 2017 (4 pages).
Faghani Mohammad et al, 5th International Conference on New Technologies, Mobility and Security (NTMS), 2012, "A Study of Trojan Propagation in Online Social Networks", pp. 1-5 p. 3, col. 2, lines 11-16, 2012 (5 pages).
Beyah R A et al: "The case for collaborative distributed wireless intrusion detection systems", Granular Computing, 2006 IEEE International Conference on Atlanta, GA, USA May 10-12, 2006, Piscataway, NJ, USA, IEEE, May 10, 2006 (May 10, 2006), pp. 782-787, XP010918931 (6 pages).
Chenxi Wang et al: "On computer viral infection and the effect of immunization", Computer Security Applications, 2000, ACSAC '00. 16th Annual Conference E New Orleans, LA, USA Dec. 11-15, 2000, Los Alamitos, CA, USA, IEEE Comput. Soc, US, Dec. 11, 2000 (Dec. 11, 2000), pp. 246-256, XP010529822 (11 pages).
Combined Search & Exam Report for GB2203361.7 dated Oct. 17, 2022 (12 pages).
Combined Search & Exam Report for GB2203366.6 dated Oct. 21, 2022 (12 pages).
Combined Search and Exam Report for 2203371.6 dated Nov. 3, 2022 (12 pages).
Combined Search and Exam Report for 2004994.6 Dated Jul. 13, 2020.
Combined Search and Exam Report for GB2002121.8 Dated Aug. 4, 2020.
Piet Van Mieghem, Computer Communications, vol. 35, Apr. 18, 2012, "The viral conductance of a network", pp. 1494-1506 see Abstract Section 2 (8 pages).
Eder-Neuhauser Peter et al: "Malware propagation in smart grid networks: metrics, simulation and comparison of three malware types", Journal of Computer Virology and Hacking Techniques, Springer Paris, Paris, vol. 15, No. 2, Aug. 28, 2018 (Aug. 28, 2018), pp. 109-125, XP036784835 (17 pages).
Exam Report for GB2002122.6 dated Nov. 30, 2021.
Faghani Mohammad R. et al: "A Study of Trojan Propagation in Online Social Networks", 2012 5th International Conference on New Technologies, Mobility and Security (NTMS) , May 1, 2012 (May 1, 2012), pp. 1-5, XP055966357, ISSN: 2157-4952, DOI: 10.1109/NTMS.2012.6208767 ISBN: 978-1-4673-0227-2 p. 3, col. 2, lines 11-16.
Combined Search & Exam Report for GB2020915.1 dated May 11, 2021 5 pages).
Combined Search & Exam Report for GB2203355.9 dated Oct. 10, 2022.
Hernandez Guillen J D et al: "A mathematical model for malware spread on WSNs with population dynamics", Physica A, North-Holland, Amsterdam, NL, vol. 545, Nov. 22, 2019 (Nov. 22, 2019), XP086098687 (11 pages).
Hosseini Soodeh Ed—Vega-Rodriguez Miguel A et al: "Defense against malware propagation in complex heterogeneous networks", Cluster Computing, Baltzer Science Publishers, Bussum, NL, vol. 24, No. 2, Sep. 12, 2020 (Sep. 12, 2020), pp. 1199-1215, XP037444601 (17 pages).
Khan Muhamad Salman et al, IEEE International Symposium on Technologies for Homeland Security (HST), 2017, "Cognitive modeling of polymorphic malware using fractal based semantic characterization", pp. 1-7 p. 2, col. 1, lines 28-33, 2017 (7 pages).
International Preliminary Report on Patentability for PCT/EP2021/ 058360 issued Aug. 11, 2022 (14 pages).
International Preliminary Report on Patentability for PCT/EP2021/ 053763 dated Sep. 1, 2022 (9 pages).
International Preliminary Report on Patentability for PCT/EP2021/ 053764 dated Sep. 1, 2022 (9 pages).
International Report on Patentability for PCT/EP2021/083783 dated Jul. 13, 2023 (8 pages).
International Search Report & Written Opinion for PCT/EP2023/ 053489 dated Apr. 13, 2023 (16 pages).
International Search Report & Written Opinion for PCT/EP2023/ 053486 dated Apr. 13, 2023 (16 pages).
International Search Report & Written Opinion for PCT/EP2023/ 053493 dated Apr. 21, 2023 (16 pages).
International Search Report & Written Opinion for PCT/EP2023/ 053494 dated Apr. 21, 2023 (17 pages).
International Search Report & Written Opinion for PCT/EP2021/ 053763 dated Mar. 9, 2021 (13 pages).
International Search Report & Written Opinion for PCT/EP2021/ 053764 dated Mar. 9, 2021 (13 pages).
International Search Report & Written Opinion for PCT/EP2021/ 083783 dated Mar. 1, 2022 (15 pages).
James Atwood et al: "Fair treatment allocations in social networks", arxiv.org, Cornell University Library, 201 Olin Libray Cornell University Ithaca, NY 14853, Nov. 1, 2019 (Nov. 1, 2019), XP081531701 (11 pages).
Lev Muchnik et al: "Initial growth rates of epidemics fail to predict their reach: A lesson from large scale malware spread analysis",

(56) References Cited

OTHER PUBLICATIONS arxiv.org, Cornell University Library, 201 Olin Library Cornell University Ithaca, NY 14853, Aug. 2, 2020 (Aug. 2, 2020), XP081730585 (19 pages).
Liu Guannan et al: "An Approach to finding the cost-effective immunization target for information assurance", Decision Support Systems, Elsevier, Amsterdam, NL, vol. 67, Aug. 19, 2014 (Aug. 19, 2014), pp. 40-52, XP029020334 (13 pages).
Matsubara Yasuko et al., "Nonlinear Dynamics of Information Diffusion in Social Networks", ACM Transactions on the Web (TWEB), ACM New York, 03 NY, USA, 2 Penn Plaza, Suite 701 New York NY 10121-0701 USA, 04 vol. 11, No. 2, Apr. 24, 2017 (Apr. 24, 2017), pp. 1-40, XP058693139 (40 pages).
Search Report for GB2002122.6 Dated Aug. 4, 2020 (4 pages).
Exam Report for GB2002122.6 dated Nov. 30, 2021 (3 pages).
Examination Report for EP21824337.6 dated Jul. 1, 2024 (5 pages).
Extended European Search Report for EP 20157627.9 dated Jun. 12, 2020 (9 pages).
Extended European Search Report for EP 20157626.1 dated Jun. 12, 2020 (10 pages).
Extended European Search Report for 20168112.9 dated Sep. 4, 2020 (9 pages).
International Search Report and Written Opinion for PCT/EP2021/058360 dated Jun. 2, 2021 (12 pages).
US Non-Final Office Action for U.S. Appl. No. 17/904,453 dated Jun. 21, 2024 (12 pages).
Written Opinion for PCT/EP2021/058360 dated Apr. 22, 2022 (7 pages).
Xu Sheng et al: "Analysis of Malware-Induced Cyber Attacks in Cyber-Physical Power Systems", IEEE Transactions on Circuits and Systems II: Express Briefs, IEEE, USA, vol. 67, No. 12, Dec. 2020, pp. 3482-3486, XPO11822703 (5 pages).
International Preliminary Report on Patentability dated Sep. 19, 2024, issued for International Application No. PCT/EP2023/053486 (9 pages).
International Preliminary Report on Patentability dated Sep. 19, 2024, issued for International Application No. PCT/EP2023/053494 (10 pages).
International Preliminary Report on Patentability dated Sep. 19, 2024, issued for International Application No. PCT/EP2023/053489 (9 pages).
International Preliminary Report on Patentability dated Sep. 19, 2024, issued for International Application No. PCT/EP2023/053493 (9 pages).
U.S. Appl. No. 17/995,365 dated Sep. 29, 2024, issued for U.S. Appl. No. 17/995,365 (33 pages).
Office Action dated Dec. 2, 2024 issued for U.S. Appl. No. 17/904,467 (13 pages).
Notice of Allowance dated Dec. 31, 2024 issued for U.S. Appl. No. 17/904,453 (9 pages).
Office Action dated Apr. 3, 2025 issued for U.S. Appl. No. 17/904,453 (17 pages).
Notice of Allowance dated May 1, 2025 issued for U.S. Appl. No. 17/995,365 (14 pages).
Notice of Allowance dated May 14, 2025 issued for U.S. Appl. No. 17/904,467 (22 pages).
Office Action dated Nov. 24, 2025 issued for U.S. Appl. No. 18/845,144 (9 pages).
Office Action dated Nov. 24, 2025 issued for U.S. Appl. No. 18/845,189 (13 pages).
Notice of Allowance dated Jan. 21, 2026, issued for U.S. Appl. No. 18/845,144 (10 pages).
U.S. Appl. No. 18/845,189, Simulation of Malware With Changing Signatures, filed Sep. 9, 2024.
U.S. Appl. No. 18/844,729, Contact Rates in Malware Simulation for Responsive Measure Deployment, filed Sep. 6, 2024.
U.S. Appl. No. 18/845,144, Time-Based Approaches in Malware Simulation for Responsive Measure Deployment, filed Sep. 9, 2024.
U.S. Appl. No. 18/844,731, Determining a Reproduction Number for a Malware, filed Sep. 6, 2024.
Office Action dated Dec. 16, 2025, issued for U.S. Appl. No. 18/844,729 (9 pages).
Communication pursuant to Article 94(3) EPC dated May 4, 2026, issued for European Application No. 23 704 149.6 (7 pages).
Notice of Allowance dated Aug. 28, 2025, issued for U.S. Appl. No. 17/995,365 (10 pages).
Notice of Allowance dated Sep. 5, 2025, issued for U.S. Appl. No. 17/904,453 (9 pages).
European Examination Report issued for EP23703806.2 dated Jun. 8, 2026 (8 pages).
European Examination Report issued for EP23704150.4 dated Jun. 9, 2026 (8 pages).
European Examination Report issued for EP23704151.2 dated Jun.10, 2026 (8 pages).
Romulus Breban et al., "Theory versus Data: How to Calculate $R_0$?"; The Semel Institute of Neuroscience and Human Behavior, David Geffen School of Medicine at University of California Los Angeles, PLoS ONE, Mar. 2007, Issue 3, e282.

* cited by examiner

DETERMINING A REPRODUCTION NUMBER FOR A MALWARE

CROSS-REFERENCE TO RELATED APPLICATIONS

This application is the U.S. national phase of International Application No. PCT/EP2023/053494 filed Feb. 13, 2023, which designated the U.S. and claims priority to GB 2203371.6 filed Mar. 10, 2022, the entire contents of each of which are hereby incorporated by reference.

TECHNICAL FIELD

Embodiments described herein relate generally to simulations of malware propagation through computer networks.

BACKGROUND

Conventional malware protection mechanisms are reactive to the detection of malware in a network or the widespread distribution of anti-malware measures. Such approaches are known as "diagnosis and treatment". Mitigation measures such as anti-malware or malware-specific protective measures may not be known for some time after an infection has been studied for its effects. Accordingly, it is beneficial to provide improvements in the simulation of the propagation of such infections through computer networks, thereby allowing for faster and more appropriate selection of malware protection mechanisms.

SUMMARY OF INVENTION

The present application relates to simulation of a network and, in particular, a network subject to a threat or attack such as malware or the like. The simulation is arranged to simulate the propagation of the threat through the network as each entity in the network (i.e. each system or device) goes through a process of being susceptible to infection, then infected, then detected (i.e. infection is detected), then ultimately removed (e.g. the infection is either remediated, mitigated or the entity is disconnected/removed from the network).

The reproduction number $R_0$ (i.e. how many secondary computer systems are infected by a primary computer system on average) constitutes a key characteristic of an infectious threat. Determining this number for a malware is particularly challenging in practice because it is difficult or not possible to determine secondary infection cases based on a primary infection case. For this reason, values of $R_0$ are typically estimated.

In the present application, the inventors propose using the simulation to determine one or more values of $R_0$. The simulation can be used to overcome the challenge of attributing secondary infected entities to primary infected entities and so a value for $R_0$ can be calculated for the simulated entities, rather than estimated.

In use, the simulation can be used to forecast $R_0$ for a given threat. Such a forecast can initially be made without any responsive measures, and then subsequent executions of the simulation with forecasting of $R_0$ for the deployment of each of a number of possible responsive measures to compare the forecast $R_0$ values. This allows an appropriate responsive measure to be selected for a real-world system.

In accordance with a first aspect of the invention, there is provided a computer-implemented method of simulating a propagation of a malware through a set of computer systems, the method comprising: identifying a plurality of first simulated computer systems infected with a simulated malware; for each of the first simulated computer systems, infecting a number of neighbouring second simulated computer systems, the number being zero or an integer; and determining a value of a reproduction number, $R_0$, based on the total number of second simulated computer systems and the number of first simulated computer systems.

The method may include repeating the steps of identifying a plurality of first simulated computer systems, infecting a number of neighbouring second simulated computer systems and determining a value of a reproduction number, $R_0$, over a plurality of time periods, such that a value of the reproduction number is determined for each of the time periods.

The method may include, for each of the time periods: deploying one or more simulated malware protection measures configured to inhibit the propagation of the simulated malware; and associating the value of the reproduction number, $R_0$, determined for the time period with the simulated malware protection measures for the time period.

The method may include: deploying one or more simulated malware protection measures configured to inhibit the propagation of the simulated malware; and associating the value(s) of the reproduction number, $R_0$, with the simulated malware protection measures.

The simulated malware protection measure may include one or more of: an anti-malware facility; a malware filter; a malware detector; a block, preclusion or cessation of interaction; and a reconfiguration of one or more simulated computer systems.

Determining the value of the reproduction number, $R_0$, may include: obtaining the total number of second simulated computer systems by summing the numbers of second simulated computer systems; determining the number of first simulated computer systems; and dividing the total number of second simulated computer systems by the number of first simulated computer systems.

The number of second simulated computer systems infected by each first simulated computer system may be determined according to an infection rate.

The method may include identifying one or more simulated computer systems as being susceptible to the simulated malware; and/or identifying one or more simulated computer systems as being insusceptible to the simulated malware.

The method may include determining a value of the effective reproduction number, $R_t$, based on the value of the reproduction number and the proportion of simulated computer systems identified as being susceptible to the simulated malware.

In accordance with a second aspect of the invention, there is provided a computer implemented malware protection method to protect at least a subset of a set of computer systems from a malware, the method comprising: accessing a model of the set of computer systems; simulating a propagation of the malware through the set of computer systems using the model, wherein the simulating comprises the method of any one of the methods set out above; and identifying, based on the determined value(s) of the reproduction number, $R_0$, one or more malware protection measures to be deployed to one or more of the set of computer systems.

The method may include deploying the one or more malware protection measures to the one or more computer systems.

In accordance with a third aspect of the invention, there is provided a system including one or more processors and a memory storing instructions that, when executed by the one or more processors, cause the one or more processors to perform any one of the methods set out above.

In accordance with a fourth aspect of the invention, there is provided a computer program comprising instructions that, when executed by a processor, cause the processor to perform any one of the methods set out above.

In the following, embodiments will be described with reference to the drawings in which.

DETAILED DESCRIPTION

Simulations of the present application model the propagation of a threat/infection/malware across the network based on modelled network communications and interactions between entities. Conventionally, such simulations employ a variety of parameters in such a model including: infection rates; detection rates; removal rates and the like. In conventional simulations, these rates are defined for the entire simulation, or at least a network or sub-network.

Figure 1:
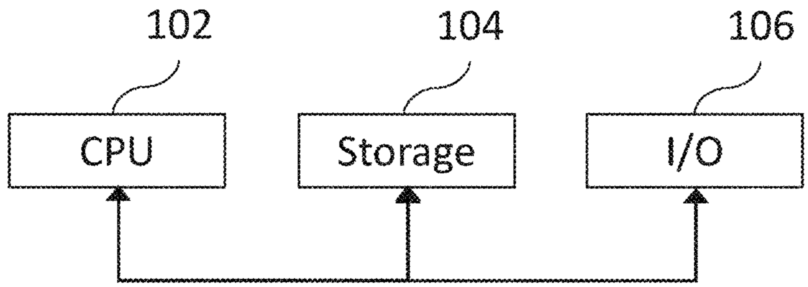
FIG. 1 shows a block diagram of a computer system suitable for the operation of the method according to some embodiments.

FIG. 1 is a block diagram of a computer system suitable for the operation of the present method according to some embodiments. A central processor unit (CPU) 102 is communicatively connected to a storage 104 and an input/output (I/O) interface 106 via a data bus 108. The storage 104 can be any read/write storage device such as a random-access memory (RAM) or a non-volatile storage device. An example of a non-volatile storage device includes a disk or tape storage device. The I/O interface 106 is an interface to devices for the input or output of data, or for both input and output of data. Examples of I/O devices connectable to I/O interface 106 include a keyboard, a mouse, a display (such as a monitor) and a network connection.

Malicious software, also known as computer contaminants or malware, is software that is intended to do direct or indirect harm in relation to one or more computer systems. Such harm can manifest as the disruption or prevention of the operation of all or part of a computer system, accessing private, sensitive, secure and/or secret data, software and/or resources of computing facilities, or the performance of illicit, illegal or fraudulent acts. Malware includes, inter alia, computer viruses, worms, botnets, trojans, spyware, adware, rootkits, keyloggers, dialers, malicious browser extensions or plugins and rogue security software.

Malware proliferation can occur in a number of ways. Malware can be communicated as part of an email such as an attachment or embedding. Alternatively, malware can be disguised as, or embedded, appended or otherwise communicated with or within, genuine software. Some malware is able to propagate via storage devices such as removable, mobile or portable storage including memory cards, disk drives, memory sticks and the like, or via shared or network attached storage. Malware can also be communicated over computer network connections such as the internet via websites or other network facilities or resources. Malware can propagate by exploiting vulnerabilities in computer systems such as vulnerabilities in software or hardware components including software applications, browsers, operating systems, device drivers or networking, interface or storage hardware.

A vulnerability is a weakness in a computer system, such as a computer, operating system, network of connected computers or one or more software components such as applications. Such weaknesses can manifest as defects, errors or bugs in software code that present an exploitable security weakness. An example of such a weakness is a buffer-overrun vulnerability, in which, in one form, an interface designed to store data in an area of memory allows a caller to supply more data than will fit in the area of memory. The extra data can overwrite executable code stored in the memory and thus such a weakness can permit the storage of malicious executable code within an executable area of memory. An example of such malicious executable code is known as 'shellcode' which can be used to exploit a vulnerability by, for example, the execution, installation and/or reconfiguration of resources in a computer system. Such weaknesses, once exploited, can bootstrap a process of greater exploitation of a target system, and propagation of the malware to other computer systems. The effects of malware on the operation and/or security of a computer system lead to a need to identify malware in a computer system in order to implement protective and/or remedial measures.

While malware detection is often directed to computer systems themselves or the networks over which they communicate, embodiments of the present invention recognise that interactions between computer systems transcend the physical interconnections therebetween.

In particular, embodiments of the present invention are directed to addressing interactions between electronic devices or computer systems that arise from communication between pairs of electronic devices or computer systems in a network. Such interactions can include, for example, interactions between users of each of a pair of electronic device or computer systems using, inter alia, social media, messaging, electronic mail or file sharing facilities. Thus, embodiments of the present invention employ a model or simulation of a set of electronic devices or computer systems in which interacting pairs of computer systems are identified, such interactions being based on previous communication occurring between the electronic device or computer systems in the pair.

Notably, such a model (or simulation) may disregard intermediates in an interaction—such as physical resources or other computer systems involved in a communication. For example, an interaction arising from a social media communication between two users using each of a pair of computer systems will involve potentially multiple physical or logical networks, intermediate servers, service provider hosts, intermediate communication appliances and the like.

As a result, a model (or simulation) of the physical communication becomes burdened by the intermediate features of a typical inter-computer communication. In contrast, embodiments of the present invention address the endpoints of an interaction such as the computer systems through which users communicate. A similar analysis can be conducted for interactions involving email, electronic messaging, file sharing and the like.

Ideally, the behaviour and characteristics of an infection in the simulation of the infected network accurately reflects the behaviour and characteristics of an infection in a real network. Embodiments of the present invention relate to improvements in such simulations, providing a more accurate simulation of the propagation of malware through a network (i.e. compared with the propagation of malware through a real network). This allows for a more effective determination of suitable mitigation measures that can be employed to mitigate the spread of the malware, or infection, throughout the network. The deployment of malware protection measures is targeted to provide an effective and/or efficient inhibition of the propagation of the infection on the network.

The nature and type of malware protection measures themselves are understood by those skilled in the art and can include, inter alia: anti-malware facilities; malware filters; malware detectors; a block, preclusion or cessation of interaction and/or communication, such as between computer systems; and/or a reconfiguration of one or more computer systems or communications facilities therebetween.

Embodiments of the present invention identify computer systems or interacting pairs of computer systems for the deployment of malware protection measures based on a simulation of a propagation of malware through the model of a set of computer systems. Such a simulation employs simulation parameters including: a rate of interaction (or a contact rate) between each interacting pair of computer systems (i.e. a number of interactions per time period); a rate of transmission of the malware between interacting computer systems per interaction; a rate of detection of malware in the network; and a rate of removal of computer systems from the network to slow or stop the rate of infection. Some or all of these parameters may be derived statistically according to a statistical distribution. In some embodiments, some or all of these parameters may be determined based on historical interaction information over a historical time period. In some embodiments, some or all of these parameters are determined based on one or more machine learning processes based on historical interaction information.

Preferably, mitigation measures are intended to directly affect the transmission rate, detection rate, and/or removal rate for a malware, or an infection, propagating through a network. For example, implementing an adjustment or supplement to security facilities such as antimalware, proxies, firewalls and the like within the network such as by modifying policies for such facilities can directly affect one or more of these rates.

Mitigative measures can further include protective or interruptive measures including one or more of, inter alia: deployment of malware remediation facilities such as anti-malware; the isolation of a subset of the network by interrupting communications along one or more selected edges; the disconnection of one or more devices from the network; the instigation of protective measures in respect of data stored at devices in advance of their predicted infection such as backup, storage, offlining or disconnection of sensitive data stores; the generation of new networks of devices such as to exclude devices predicted to be infected; affecting a transmission rate within a network or between pairs of devices in the network such as by throttling or otherwise affecting a rate or frequency of communication between devices, or to limit/constrain a "size" of communication (e.g. payload size) or otherwise constrain communication (e.g. imposing new limits) [all of these are particularly beneficial]; and the propagation of alerts and/or information to devices on the network. Such mitigative measure can be determined and configured cognisant of the time required to effect such mitigation and the forecast state of the network and malware infection over such a time period.

Figure 2:
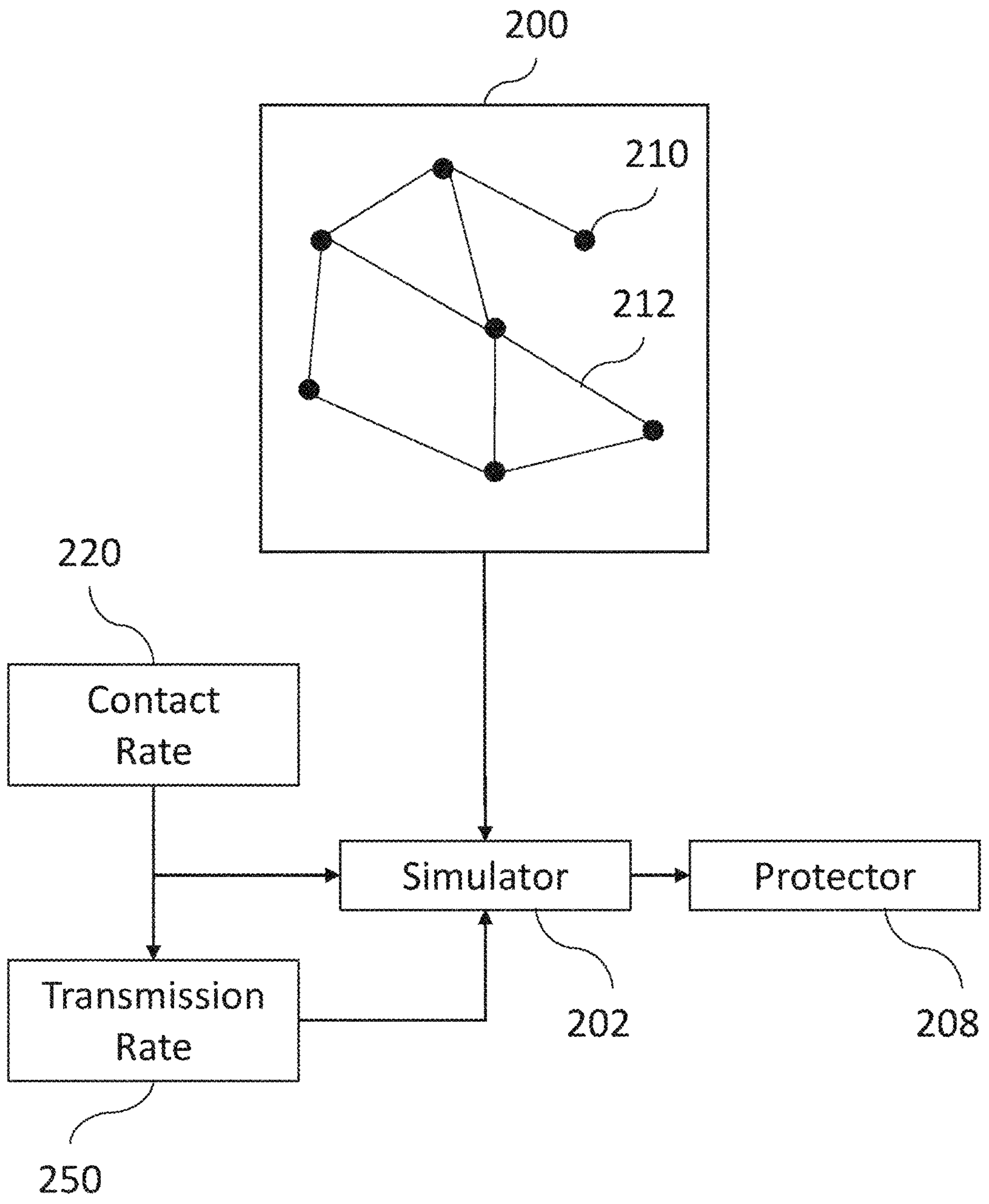
FIG. 2 shows a component diagram of an arrangement for malware protection for at least a subset of a set of computer systems according to some embodiments.

FIG. 2 is a component diagram of an arrangement for malware protection for at least a subset of a set of computer systems according to an embodiment of the present invention. A model 200 is provided as one or more data structures representing a set of computer systems and interactions therebetween. Preferably, the model is provided as a graph or similar data structure including nodes or vertices 210, each corresponding to a computer system, and edges 212 each connecting a pair of nodes 210 and representing interaction between electronic devices or computer systems corresponding to each node in the pair. Thus, an edge 212 represents interaction between a pair of electronic devices or computer systems. Each node 210 can have associated information for a corresponding node (i.e. electronic device or computer system) including, for example, inter alia: an identifier of the computer system; an identification of an organisational affiliation of the computer system; an identifier of a subnet to which the computer system is connected; and other information as will be apparent to those skilled in the art.

Preferably, an edge 212 constitutes an indication that at least one interaction has taken place over at least a predetermined historic time period between computer systems in a pair. Preferably, the existence of an edge 212 is not determinative, indicative or reflective in of itself of a degree, frequency, or propensity of interaction between computer systems in a pair. Rather, the edge 212 identifies that interaction between nodes can or has taken place. In some embodiments, edges 212 can have associated, for example, inter alia: an edge identifier; an identification of a pair of nodes (and/or the corresponding electronic devices or computer systems) that the edge interconnects; and/or interaction frequency information between a pair of computer systems.

It will be appreciated by those skilled in the art that, while the model 200 is illustrated as a literal graph in the arrangement of FIG. 2, alternative data structures and logical representations of vertices and edges can be used, such as representations employing, for example, inter alia, vectors, arrays of vectors, matrices, compressed data structures and the like.

The arrangement of FIG. 2 includes a simulator 202 as a hardware, software, firmware or combination component arranged to perform a simulation of a propagation of a malware in the set of computer systems represented by the model 200.

The simulator 202 is operable on the basis of simulation parameters including: an contact rate as a number of interactions between pairs of interacting computer systems in a time period; and a transmission rate 250 as a rate of transmission of a malware between computer systems in a pair of systems per interaction. The transmission rate 250 is a probability of transmission of a malware from one node to another node during an interaction between the nodes. The transmission rate 250 may incorporate aspects of a malware infection process.

For example, in the case of malware transmitted as a web-link between two computer systems by email, the transmission rate can reflect all of: a probability that an email is communicated between the two computer systems; a probability that the email includes the malicious web-link;

and a probability that a recipient accesses the malicious web-link resulting in malware infection.

The simulator 202 can operate on the basis of configurable characteristics such as simulation assumptions. For example, the simulator 202 may operate on the basis that any computer system as represented by a node in the model 200 can only transmit the malware to first-degree neighbours according to the model 200.

Further, the simulator 202 preferably operates on the basis that each computer system has a state of infection at a point in time. States of infection at a point in time can include, for example: a state of susceptibility in which a computer system is susceptible to infection, such as a computer system that is not and has not been so far infected and is not specifically protected from infection by a particular malware; a state of infected in which a computer system is subject to infection by the malware at the point in time; and a state of removed or remediated in which a computer system is remediated of a past infection or protected from prospective infection by the malware.

It will be appreciated by those skilled in the art that sub-states of these states can also be employed, such as, inter alia: an infected state that is not infectious (i.e. transmission of malware cannot be effected by a computer system in such a state); an infected state that is infectious; an infected state that is detected; and an infected state that is not detected (such as might be determined by the simulator 202).

Therefore, in use, the simulator 202 is operable for a time period to model the propagation of a malware infection. In some embodiments, one or more predetermined source computer systems represented in the model 200 are selected as originating computer systems for the malware infection such that propagation is simulated from such originating computer systems. Preferably, the simulator 202 is executed for each of a plurality of time periods so as to model the propagation of the malware in the set of computer systems over time. Additionally or alternatively, the simulator 202 can be performed a plurality of times for each of a plurality of predetermined source computer systems selected as originating computer systems for the malware infection.

Figure 3:
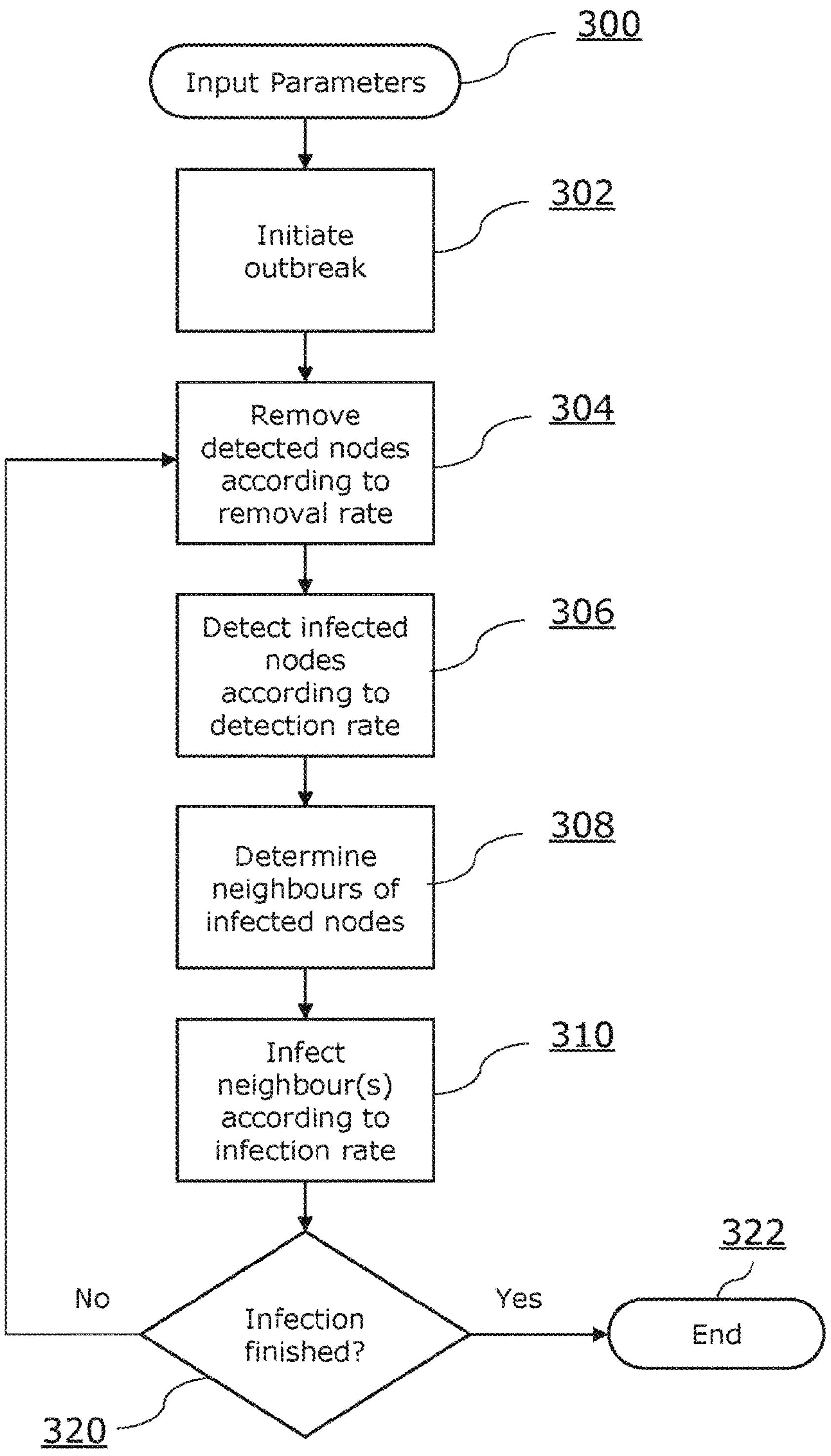
FIG. 3 shows a flowchart illustrating a simulation of propagation of a malware according to some embodiments.

FIG. 3 is a flowchart illustrating a simulation of propagation of a malware according to some embodiments. In this example, the simulation is built on a network graph model (e.g. as illustrated in FIG. 2).

At step 300, several parameters are defined for the simulation and input into the simulator, including a removal rate, a detection rate and an infection rate. Each of these parameters takes a value between 0 and 1. In some embodiments, one or malware protection measures may be deployed. The malware protection measures may be any one of the malware protection measures described herein.

In the present example, each of the nodes has four Boolean states: susceptible, infected, detected, and removed. Initially, every node is set to susceptible, uninfected, undetected and not removed. At step 302, an outbreak is initiated by setting the state of one or more nodes to infected. These nodes may be referred to as "outbreak nodes".

At step 304, detected nodes are removed from the network according to the removal rate. That is to say, the infected nodes that have been detected are isolated from the rest of the network (i.e. by severing the connection to neighbouring nodes). The state of these nodes is set to "removed".

At step 306, a number of the infected nodes are detected according to the detection rate. The state of these nodes is set to "detected".

At step 308, the neighbours of the infected nodes are determined. The susceptible neighbours are then infected according to the infection rate at step 310. The state of these nodes is set to "infected".

At step 320, it is determined whether the infection is finished, i.e. whether the malware is able to spread any further, or if the maximum number of steps for the simulation has been reached. For example, if the infected nodes are all removed, then these nodes cannot infect any other nodes and the malware cannot spread any further. If the malware cannot spread any further, the simulation ends at step 322, and optionally statistics for the simulation are calculated. Otherwise, if the malware can still spread further, steps 304-310 are repeated.

Steps 304 to 308 are discussed above in a particular sequence. However, it will be appreciated that this sequence is not intended to be limiting, and steps 304 to 308 may instead be carried out in any appropriate sequence or order.

As is further shown in FIG. 2, responsive to the simulation by the simulator 202, and, in particular, responsive to the model of propagation of a malware determined by the simulator 202, a protector component 208 may be implemented. Here, the protector 208 may be operable to deploy malware protection measures intended to inhibit a propagation of the malware through the set of computer systems. The protector component 208 may be a hardware, software, firmware or combination component arranged to access output from the simulator 202 such as one or more models, data structure representations, images, animations, visually renderable indications or other suitable representations of states of nodes corresponding to simulated states of computer systems in the set of computer systems. For example, a representation of states of computer systems may be provided based on the model 200 so as to indicate, for each computer system by way of a node in the model 200, a state of the computer system (such as susceptible, infected, removed) over each of a plurality of time periods for which the simulator 202 was executed.

The protector 208 may identify one or more computer systems or interacting pairs of computer systems (such as are represented by edges 212 in the model 200) for the deployment of malware protection measures. Such identified systems or pairs of systems can be selected based on, for example, inter alia: a computer system or interacting pair of systems through which malware propagates in the simulation to a subset of other computer systems in the set of computer systems; identifying a subset of computer systems having a relatively greater, or greatest, proportion of computer systems infected by the malware according to the simulation, so as to identify one or more computer systems or pairs of systems as a gateway, link or bridge to such identified subset; a number of computer systems to which the malware is propagated via a computer system or pair of systems; and other criteria as will be apparent to those skilled in the art. For example, "choke-points" in the model 200 can be identified by the protector 208 based on the simulator 202 output as nodes or pairs of nodes representing computer systems or interacting pairs of systems constituting pathways for propagation of the malware to subsets of nodes in the model 200. The malware protection measures deployed by the protector 208 can include those previously described, and in this way at least a subset of the set of computer systems can be protected from the malware by the targeted deployment of malware protection measures.

In view of the above, the simulator 202 can be used to simulate the propagation of malware through a computer network (or computer system) in a realistic manner, such that the protector 208 may use the simulation to improve the selection of one or more appropriate malware protection measures for implementing in the computer network. Such appropriately selected one or more malware protection measures may then be deployed in a computer network (or computer system), either in response to a real malware infection, or as a pre-emptive measure to prevent or reduce the likelihood of an infection propagating. Consequently, the more realistic the simulation of malware propagation in the modelled computer network is, the better the protector 208 is able to select an appropriate and effective malware protection measure to contain, counteract, or pre-emptively prevent a real malware infection in the computer network.

Figure 4:
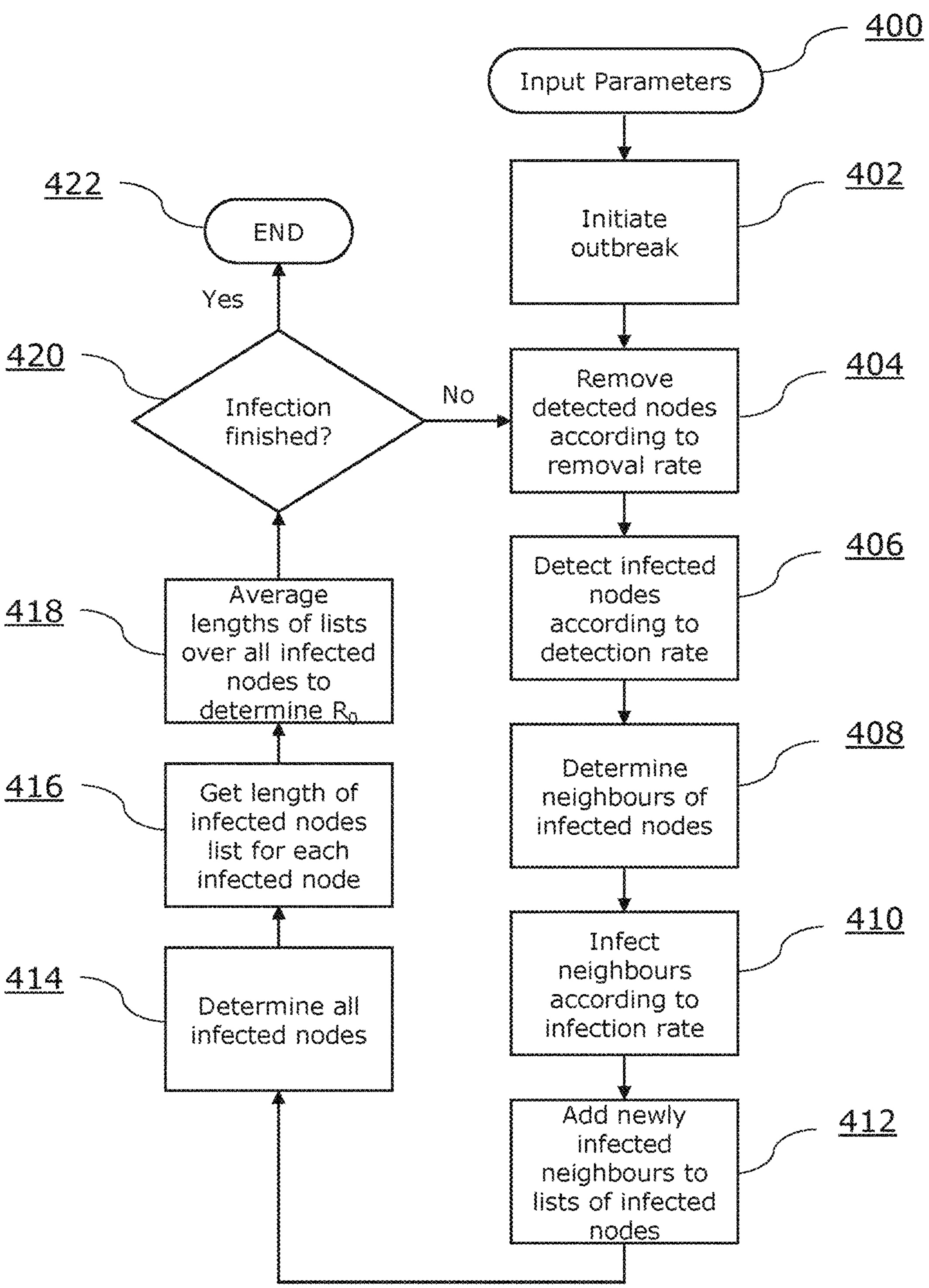
FIG. 4 is a flowchart illustrating a method of determining a reproduction number, $R_0$, according to some embodiments.

FIG. 4 shows a flowchart illustrating a method of determining a reproduction number, $R_0$, according to some embodiments.

Step 400 is similar to step 300 of FIG. 3. A removal rate, a detection rate and an infection rate are defined for the simulation and input into the simulator. In addition, one or more mitigation measures may be deployed.

In the present example, each of the nodes has four Boolean states: susceptible, infected, detected, and removed. Initially, every node is set to susceptible, uninfected, undetected and not removed. In some examples, one or more nodes may be patched (i.e. the state of the nodes is set to insusceptible).

Step 402 is similar to step 302; however, in addition to the actions of step 302, a secondary infections list is created for each node. These infection lists are used to track which nodes each node has infected. Initially, each infection list is empty.

Steps 404-410 are the same as steps 304-310 of FIG. 3, and so a description of these steps is not repeated here.

At step 412, following the step 410 of each primary infected node infecting a number of neighbouring secondary nodes, the secondary infection list for each primary node is updated with the identification number of the secondary node(s) that it infected.

Steps 414-418 define how the reproduction number $R_0$ is determined. At step 414, all the primary infected nodes are determined. At step 416, the secondary infection list for each primary infected node is obtained, and the length of the list (i.e. the number of entries) is determined. For example, if a primary node has infected three secondary nodes, then the length of the secondary infection list is three.

At step 418, the lengths of all the infection lists are summed together, and the resulting number is divided by the number of primary infected nodes. The result of this calculation is the $R_0$ value. In examples where a mitigation measure is deployed, the determined value of the reproduction number $R_0$ provides an objective measure of the impact of the mitigation measure on the spread of an infection.

In some examples, a value of the effective reproduction number $R_t$ may be determined, by multiplying the value of the reproduction number $R_0$ and the proportion of nodes, p, that are susceptible to the malware.

If the infection has not finished, steps 404-418 are repeated for one or more further time periods, and a new $R_0$ value is determined for each iteration of steps 404-418. In this way, a series of $R_0$ values may be obtained, with each $R_0$ value corresponding to a given time period. In some examples, one or more mitigation measures may be deployed for each time period. For example, in a first time period a first node may be removed, in a second time period a second node may be removed, and in a third time period a third node may be patched. In this case, each $R_0$ value corresponds to a particular mitigation measure, and the effects of different mitigation measures over the course of the simulation can be evaluated.

If the infection has finished, the simulation ends at step 422, and optionally, statistics for the simulation can be calculated. If desired, the simulation can be repeated using one or more mitigation measures if no mitigation measures were initially used, or using different mitigation measures if mitigation measures were initially used.

Figure 5:
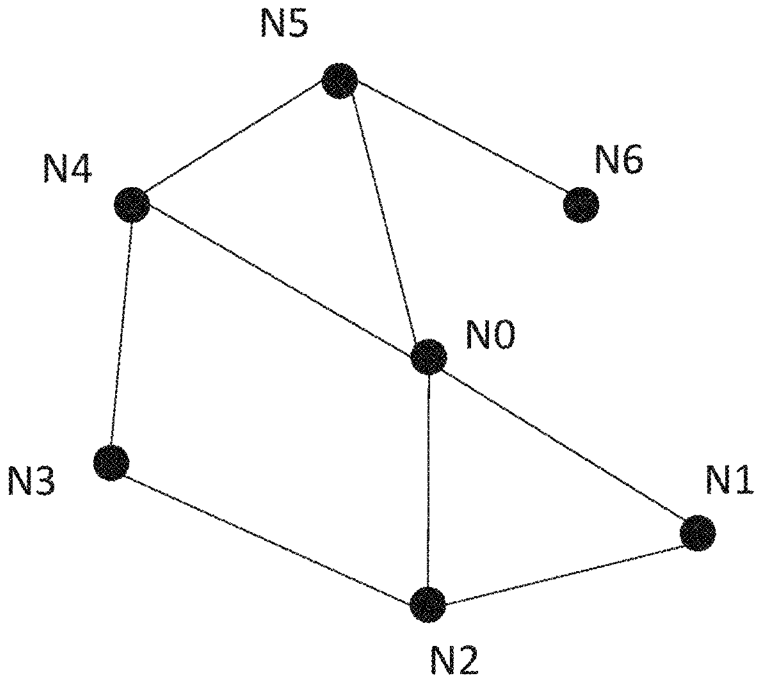
FIG. 5 shows an example of a network graph.

An example of a network graph is shown in FIG. 5. The network graph includes seven nodes N0-N6, each of which corresponds to a computer system. Each of the nodes is connected to at least one other node. An example simulation using the network graph shown in FIG. 5 will now be described. In this example, the infection rate is 0.2, the detection rate is 0.8, and the removal rate is 1.0. The step time is 1 hour.

At step S1, the time for the simulation is initialised to t=00:00. A secondary infections list is initialised for each node. The state of the central node N0 is set to infected with a malware.

At step S2, detected nodes are removed according to the removal rate. At present, no nodes have been detected, so no nodes are removed.

At step S3, infected nodes are detected according to the detection rate. In the present example, node N0 is detected.

At step S4, neighbours of infected nodes are infected according to the infection rate. In the present example, the node N5 is infected, i.e. the malware is passed on to node N5 from node N0. The secondary infections list for node N0 is updated to include the node N5.

At step S5, a value of the reproduction number $R_0$ is determined. First, all the primary infected nodes are determined. Then, the length of the secondary infections list for each initially infected node is obtained. In this case, the only node that was initially infected with the malware is node N0. The secondary infections list for node N0 includes one node (N5), and thus has a length of 1. The lengths of the secondary infections lists are then averaged over the number of primary infected nodes to obtain a value of the reproduction number $R_0$. In the present case, this average is 1 divided by 1. Therefore $R_0=1$.

Optionally, a value of the effective reproduction number $R_t$ may be determined, by multiplying the value of the reproduction number $R_0$ and the proportion of nodes that are susceptible to the malware p. In the present example, every node is susceptible to the malware, and therefore $R_t=R_0\times p=1\times1=1$.

At step S6, the time is incremented by 1 hour, so t=02:00.

At step S7, detected nodes are removed according to the removal rate. Since node N0 has been detected, it is removed.

At step S8, infected nodes are detected according to the detection rate. In the present case, randomly no new nodes are detected.

At step S9, neighbours of primary infected nodes are infected according to the infection rate. In the present example, node N5 randomly infects two other nodes N4 and N6, i.e. the malware is passed on from node N5 to nodes N4 and N6. The secondary infections list for node N5 is updated to include the nodes N4 and N6.

At step S10, a value of the reproduction number $R_0$ is determined. First, all the primary infected nodes are determined. In this case, the two nodes that were initially infected with the malware are node N0 and node N5. The secondary infections list is then obtained for each primary infected node, and the length of each secondary infections list is obtained. In this case, the secondary infections list for node N0 includes one node (N5) and the secondary infections list for node N5 includes two nodes (N4 and N6). The lengths of the secondary infections lists for these nodes are thus 1 and 2 respectively. The lengths of the secondary infections lists are then averaged over the number of primary infected nodes to obtain a value of the reproduction number $R_0$. In the present case, this average is (1+2)/2. Therefore $R_0=1.5$. Again, $R_0=R_t=1$, since all nodes are susceptible.

At step S11, the time is incremented by 1 hour, so t=03:00. For this step, nodes N1 and N2 are patched.

At step S12, the detected nodes are removed according to the removal rate. In the present example, there are no newly detected nodes, so no nodes are removed.

At step S13, infected nodes are detected according to the detection rate. In the present case, node N4 is randomly detected.

At step S14, neighbours of infected nodes are infected according to the infection rate. In the present example, node N4 randomly infects node N3. The secondary infections list for node N4 is updated to include the node N3.

At step S15, a value of the reproduction number $R_0$ is determined. The lengths of the secondary infections lists of the initially infected nodes (nodes N0, N4, N5 and N6) are determined, giving 1, 1, 2, 0. These values are then averaged over the number of initially infected nodes to obtain a value of the reproduction number $R_0$. In the present case, this average is (1+1+2+0)/4=1. Therefore $R_0=1$. Since nodes N1 and N2 are not susceptible to the malware, only 5/7 nodes are susceptible. Therefore $R_t=R_0 \times p=1\times(5/7)=5/7=0.71$.

In the present case, no more nodes can be infected, therefore the infection has finished.

Figure 6:
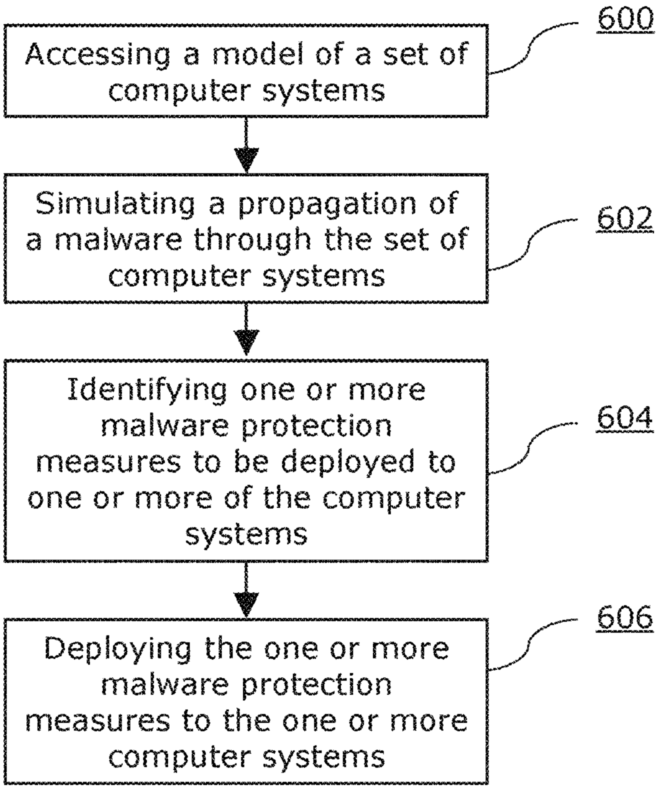
FIG. 6 shows a flowchart illustrating a method of a malware protection method according to some embodiments.

FIG. 6 is a flowchart of a malware protection method according to some embodiments. The malware protection method aims to protect at least a subset of a set of computer systems from a malware.

At step 600, a model of a set of computer systems is accessed. The model may be a graph, e.g. as shown in FIG. 2. The model identifies computer systems in the set and interactions therebetween based on previous communication occurring between the computer systems. Each interaction is identified for an interacting pair of computer systems, and each computer system is identified by the model as having an indication of a state of malware infection as one of susceptible to infection by the malware and infected by the malware.

At step 602, propagation of the malware through the set of computer systems is simulated using the model. The simulation may be performed using any of the methods described herein, for example the method described above in relation to FIG. 4.

At step 604, one or more malware protection measures that are to be deployed to one or more computer systems are identified. The malware protection measures are identified based on the results of the simulation performed in step 602.

At step 606, the malware protection measures identified in step 604 are deployed to the one or more computer systems.

Performing the above method using a simulation where one or more values of a reproduction number are determined can be useful for identifying an appropriate malware protection measure to deploy in a real-world network. For example, if the determined reproduction number is relatively high (e.g. 2-3), then a strict malware protection measure (e.g. removing computer systems from the network) may be deployed. Alternatively, if the determined reproduction number is relatively low (e.g. <1), then a less severe malware protection measure (e.g. patching computer systems) may be deployed.

Furthermore, in examples where one or more mitigation measures are deployed as part of the simulation, the reproduction number associated with each mitigation measure can be used to form a guided decision in a real-world system. For example, reproduction number values determined for different mitigation measures can be compared, and the mitigation measure(s) exhibiting the greatest impact (or at least a degree of impact meeting a threshold degree) on the reproduction number can be selected for deployment to protect a real-world network. Hence, determining the reproduction numbers simplifies the process of selecting one or more malware protection measures for deployment in a real-world network.

Any of the above discussed methods may be performed using a computer system or similar computational resource, or system comprising one or more processors and a non-transitory memory storing one or more programs configured to execute the method. Likewise, a non-transitory computer readable storage medium may store one or more programs that comprise instructions that, when executed, carry out the methods described herein.

Whilst certain embodiments have been described, these embodiments have been presented by way of example only, and are not intended to limit the scope of the application. Indeed, the novel devices, and methods described herein may be embodied in a variety of other forms; furthermore, various omissions, substitutions and changes in the form of the devices, methods and products described herein may be made without departing from the scope of the present application. The word "comprising" can mean "including" or "consisting of" and therefore does not exclude the presence of elements or steps other than those listed in any claim or the specification as a whole. The mere fact that certain measures are recited in mutually different dependent claims does not indicate that a combination of these measures cannot be used to advantage. The accompanying claims and their equivalents are intended to cover such forms or modifications as would fall within the scope of the application.

The invention claimed is:

1. A computer-implemented method of simulating a propagation of a malware through a set of computer systems, the method comprising:

identifying a plurality of first simulated computer systems infected with a simulated malware;

for each of the first simulated computer systems, infecting a number of neighbouring second simulated computer systems, the number being zero or an integer; and determining a value of a reproduction number, $R_0$, based on the total number of second simulated computer systems and the number of first simulated computer systems.

2. The method of claim 1, comprising:

repeating the steps of identifying a plurality of first simulated computer systems, infecting a number of neighbouring second simulated computer systems and determining a value of a reproduction number, $R_0$, over a plurality of time periods, such that a value of the reproduction number is determined for each of the time periods.

3. The method of claim 2, comprising:

for each of the time periods:

deploying one or more simulated malware protection measures configured to inhibit the propagation of the simulated malware; and associating the value of the reproduction number, $R_0$, determined for the time period with the simulated malware protection measures for the time period.

4. The method of claim 1, comprising:
deploying one or more simulated malware protection measures configured to inhibit the propagation of the simulated malware; and
associating the value(s) of the reproduction number, $R_0$, with the simulated malware protection measures.

5. The method of claim 3, wherein the simulated malware protection measure includes one or more of: an anti-malware facility; a malware filter; a malware detector; a block, preclusion or cessation of interaction; or a reconfiguration of one or more simulated computer systems.

6. The method of claim 1, wherein determining the value of the reproduction number, $R_0$, comprises:
obtaining the total number of second simulated computer systems by summing the numbers of second simulated computer systems;
determining the number of first simulated computer systems; and
dividing the total number of second simulated computer systems by the number of first simulated computer systems.

7. The method of claim 1, wherein the number of second simulated computer systems infected by each first simulated computer system is determined according to an infection rate.

8. The method of claim 1, comprising:
identifying one or more simulated computer systems as being susceptible to the simulated malware; and/or
identifying one or more simulated computer systems as being insusceptible to the simulated malware.

9. The method of claim 1, comprising:
determining a value of an effective reproduction number, $R_t$, based on the value of the reproduction number and a proportion of simulated computer systems identified as being susceptible to the simulated malware.

10. A computer implemented malware protection method to protect at least a subset of a set of computer systems from a malware, the method comprising:
accessing a model of the set of computer systems;
simulating a propagation of the malware through the set of computer systems using the model, wherein the simulating comprises a method including:
identifying a plurality of first simulated computer systems infected with a simulated malware;
for each of the first simulated computer systems, infecting a number of neighbouring second simulated computer systems, the number being zero or an integer; and
determining a value of a reproduction number, $R_0$, based on the total number of second simulated computer systems and the number of first simulated computer systems; and
identifying, based on the determined value(s) of the reproduction number, $R_0$, one or more malware protection measures to be deployed to one or more of the set of computer systems.

11. The method of claim 10, comprising:
deploying the one or more malware protection measures to the one or more computer systems.

12. A system including one or more processors and a memory storing instructions that, when executed by the one or more processors, cause the one or more processors to simulate a propagation of a malware through a set of computer systems by at least being configured to:
identify a plurality of first simulated computer systems infected with a simulated malware;
for each of the first simulated computer systems, infect a number of neighbouring second simulated computer systems, the number being zero or an integer; and
determine a value of a reproduction number, $R_0$, based on the total number of second simulated computer systems and the number of first simulated computer systems.

13. A non-transitory computer-readable storage medium storing a computer program comprising instructions that, when executed by a processor, cause the processor to perform the method of claim 1.

14. The system of claim 12, wherein the one or more processors is further configured to:
repeat steps of identifying a plurality of first simulated computer systems, infecting a number of neighbouring second simulated computer systems and determining a value of a reproduction number, $R_0$, over a plurality of time periods, such that a value of the reproduction number is determined for each of the time periods.

15. The system of claim 14, wherein the one or more processors is further configured to:
for each of the time periods:
deploy one or more simulated malware protection measures configured to inhibit the propagation of the simulated malware; and
associate the value of the reproduction number, $R_0$, determined for the time period with the simulated malware protection measures for the time period.

16. The system of claim 12, wherein the one or more processors is further configured to:
deploy one or more simulated malware protection measures configured to inhibit the propagation of the simulated malware; and
associate the value(s) of the reproduction number, $R_0$, with the simulated malware protection measures;
wherein the simulated malware protection measure includes one or more of: an anti-malware facility; a malware filter; a malware detector; a block, preclusion or cessation of interaction; or a reconfiguration of one or more simulated computer systems.

17. The system of claim 12, wherein the one or more processors, to determine the value of the reproduction number, $R_0$, is further configured to:
obtain the total number of second simulated computer systems by summing the numbers of second simulated computer systems;
determine the number of first simulated computer systems; and
divide the total number of second simulated computer systems by the number of first simulated computer systems.

18. The system of claim 12, wherein the number of second simulated computer systems infected by each first simulated computer system is determined according to an infection rate.

19. The system of claim 12, wherein the one or more processors is further configured to:
identify one or more simulated computer systems as being susceptible to the simulated malware; and
identify one or more simulated computer systems as being insusceptible to the simulated malware.

20. The system of claim 12, wherein the one or more processors is further configured to:
determine a value of an effective reproduction number, $R_t$, based on the value of the reproduction number and a proportion of simulated computer systems identified as being susceptible to the simulated malware.

* * * * *